United States Patent [19]

Stratton et al.

[11] Patent Number: 4,986,167
[45] Date of Patent: Jan. 22, 1991

[54] ARTICULATED PISTON WITH A COOLING RECESS HAVING A PREESTABLISHED VOLUME THEREIN

[75] Inventors: Michael Stratton, Peoria; Clifford O. Jeske, Brimfield, both of Ill.

[73] Assignee: Caterpillar Inc., Peoria, Ill.

[21] Appl. No.: 356,489

[22] Filed: May 25, 1989

[51] Int. Cl.⁵ ............................................. F01B 31/08
[52] U.S. Cl. ........................................ 92/186; 92/189; 123/193 P
[58] Field of Search ................. 92/174, 176, 186, 189, 92/190, 222, 144; 123/193 P

[56] References Cited

U.S. PATENT DOCUMENTS

| | | | |
|---|---|---|---|
| 2,720,871 | 10/1955 | Morris | 92/186 |
| 2,815,011 | 12/1957 | Holt | 123/41.38 |
| 3,221,718 | 12/1965 | Isley | 123/32 |
| 3,336,844 | 8/1967 | Cornet | 92/224 |
| 3,628,511 | 12/1971 | Fischer | 92/186 |
| 3,805,677 | 4/1974 | Clary et al. | 92/186 |
| 4,056,044 | 11/1977 | Kamman et al. | 92/159 |
| 4,180,027 | 12/1979 | Taylor | 92/186 |
| 4,377,967 | 3/1983 | Pelizzoni | 92/186 |
| 4,505,233 | 3/1985 | Kanda et al. | 92/186 |
| 4,506,632 | 3/1985 | Kanda et al. | 123/193 P |
| 4,581,983 | 4/1986 | Moebus | 92/186 |
| 4,867,119 | 9/1989 | Cooper et al. | 123/193 P |

FOREIGN PATENT DOCUMENTS

| | | | |
|---|---|---|---|
| 0219252 | 12/1958 | Australia | 92/186 |
| 141666 | 5/1935 | Austria | 92/186 |
| 0237853 | 9/1987 | European Pat. Off. | 123/193 P |
| 100669 | 4/1957 | Fed. Rep. of Germany | 92/186 |
| 0964281 | 5/1957 | Fed. Rep. of Germany | 91/176 |
| 3643039A1 | 6/1988 | Fed. Rep. of Germany . | |
| WO8804725 | 6/1988 | Fed. Rep. of Germany . | |
| 0017347 | 1/1987 | Japan | 123/193 P |
| 0041919 | 2/1987 | Japan | 123/193 P |
| 0194997 | 3/1923 | United Kingdom | 92/186 |
| 2199637A | 7/1988 | United Kingdom . | |
| 2200718A | 8/1988 | United Kingdom . | |

*Primary Examiner*—Edward K. Look
*Assistant Examiner*—Thomas Denion
*Attorney, Agent, or Firm*—Larry G. Cain

[57] ABSTRACT

The design and construction of past articulated pistons has failed to include the most efficient cooling reservoir for transferring heat from the piston to the coolant. The present invention overcomes these problems by using an annular cooling recess of a precisely defined cross sectional shape and volume and a baffle plate fixedly sealingly attached in heat conducting relationship to the piston member to form a cooling gallery. The baffle plate has an opening therein and an upwardly extending raised portion to preestablish a trapped volume of coolant therein. The assembly, positioning of the plate and the preestablished trapped volume insures high efficiency of the coolant to absorb heat through the scrubbing action of the coolant on the recess and the heat absorbed by the trapped coolant because of the heat conducting relationship of the plate and the piston member.

30 Claims, 4 Drawing Sheets

ARTICULATED PISTON WITH A COOLING RECESS HAVING A PREESTABLISHED VOLUME THEREIN

DESCRIPTION

1. Technical Field

This invention relates generally to a piston member of an articulated piston for use in an internal combustion engine, and more particularly to the improved cooling of the piston member by increasing the effectiveness of the cooling recess.

2. Background Art

The last several years has seen an increasing amount of emphasis on designing engines more compactly and yet with improved fuel economy and efficiency, reduced emissions, a greater service life, and an increased power output per cylinder. As present day engines are converted or upgraded the piston assembly is subjected to even higher combustion chamber pressures and temperatures.

Attempts have been made to overcome the effect of higher temperatures induced into pistons. One of the primary paths attempted has been to increase the efficiency of heat rejection from the stone. For example, in U.S. Pat. No. 2,815,011 issued to George A. Holt on Dec. 3, 1957 a single piece piston has a trough member secured to the underside of the piston. The trough member is used to collect coolant, splash the coolant against the bottom of the piston and extract heat from the piston into the coolant. A wall of the trough lies close to the piston but is not in heat conducting contact therewith. Thus, the trough which is not in good heat transferring contact with the heat transferring portion of the piston could be more efficient in extracting heat and reducing the temperature of the piston.

The cooled piston assembly disclosed in U.S. Pat. No. 4,056,044 issued to Kenneth R. Kamman on Nov. 1, 1977 is of a two piece design and includes a main body and a skirt connected by a wrist pin. The body has an outer chamber therein into which lubricating and cooling oil is directed. The skirt includes an annular groove positioned under the chamber to collect oil from the chamber. The collected oil is splashed into the chamber by the reciprocating strokes of the piston assembly further cooling the main body in the chamber area. The cooling oil is directed into the chamber, flows along the surface of the chamber absorbing a portion of heat and a portion of the coolant falls into the groove to repeat the above motion. Although this design is workable, the efficiency of heat transfer from the main body to the coolant is less than optimum since the groove is in the skirt and is not in good heat transferring contact with the heat transferring portion of the piston.

The two-piece piston assembly disclosed in U.S. Pat. No. 4,377,967 issued to Winton J. Pelizzoni Mar. 29, 1983 illustrates a two-piece piston assembly comprising an upper portion and a lower portion. A separate cup-like device is secured around the outside of the lower end of the crown member of the piston. The cup-like device is used to collect coolant, splash the coolant against the bottom of the piston and extract heat from the piston into the coolant. Although the device is attached to the upper portion it is attached at the lower portion of the lower ring land which is in poor heat conducting relationship to the hottest portion of the upper portion, the crown. Thus, the cup-like device is not in good heat conducting relationship to the crown and does not teach or suggest a controlled volume of coolant to be retained in the cup-like devise or a recess so that a relationship to the overall volume of the recess to the volume of the device can be determined.

A piston head is disclosed in Great Britain Patent Application Publication No. 2,199,637 issued to Emil Ripberger and Hanspeter Wieland and published on July 13, 1988. The application discloses a forged piston head having an annular cooling oil chamber with an inlet and outlet. The cooling chamber is formed as an integral part of the piston head by deforming individual prongs into a closed wall. Each of the prongs which form the cooling chamber is in heat transferring connection with the piston head. However, the deforming of the prongs do not assure a sealed joint therebetween nor is a volume control provided in the recess; thus, a reservoir to retain coolant and increase the contact time of the coolant to the heat transferring portion of the piston is not shown.

Thus, what is needed is a high output engine piston assembly and piston member thereof which is capable of continuous and efficient operation. Furthermore, the piston member should be relatively easy to manufacture, have a continually replenished supply of a predetermined quantity of coolant retained in a reservoir to increase the contact time of the coolant to the heat transferring portion of the piston and have an enhanced thermal conducting path from the heat transferring portion of the piston to the coolant reservoir.

The present invention is directed to overcoming one or more of the problems as set forth above.

DISCLOSURE OF THE INVENTION

In one aspect of the present invention, an articulated piston assembly includes a piston member and a skirt portion adapted for use in an engine. An upper portion of the piston member being substantially cylindrical in shape and having a peripheral top surface, a tubular wall depending from the top surface, an outwardly facing wall portion and a downwardly facing annular cooling recess. The lower portion includes a pair of depending pin bosses blendingly associated with the outwardly facing wall portion. The pin bosses individually define a wrist pin receiving bore aligned on a common axis. A skirt is positioned about the lower portion and has a pair of wrist pin receiving bores aligned with the common axis. A wrist pin is disposed in the pair of wrist pin receiving bores of the skirt and the wrist pin receiving bores in the lower portion of the piston member and slidably attaches the skirt to the piston member. At least, one baffle plate is positioned in the annular cooling recess and is fixedly sealingly attached to the upper portion of the piston member in heat conducting relationship forming a cooling gallery having a preestablished volume, and at least one opening therein.

In a further aspect of the invention, a steel piston member includes an upper portion and a lower portion for reciprocatable movement in a combustion chamber engine. An upper portion of the piston member being substantially cylindrical in shape has a peripheral top surface, a tubular wall depending from the top surface, an outwardly facing wall portion and a downwardly facing annular cooling recess. The lower portion includes a pair of depending pin bosses blendingly associated with the outwardly facing wall portion. At least one baffle plate is positioned in the recess and fixedly sealingly attached to the upper portion of the piston member in heat conducting relationship forming a cooling gallery having a preestablished volume and at least one opening therein.

More specifically, the piston assembly of the present invention has a steel piston member with a cooling gallery having an opening therein and a preestablished trapped volume.

BEST MODE FOR CARRYING OUT THE INVENTION

Figure 1:
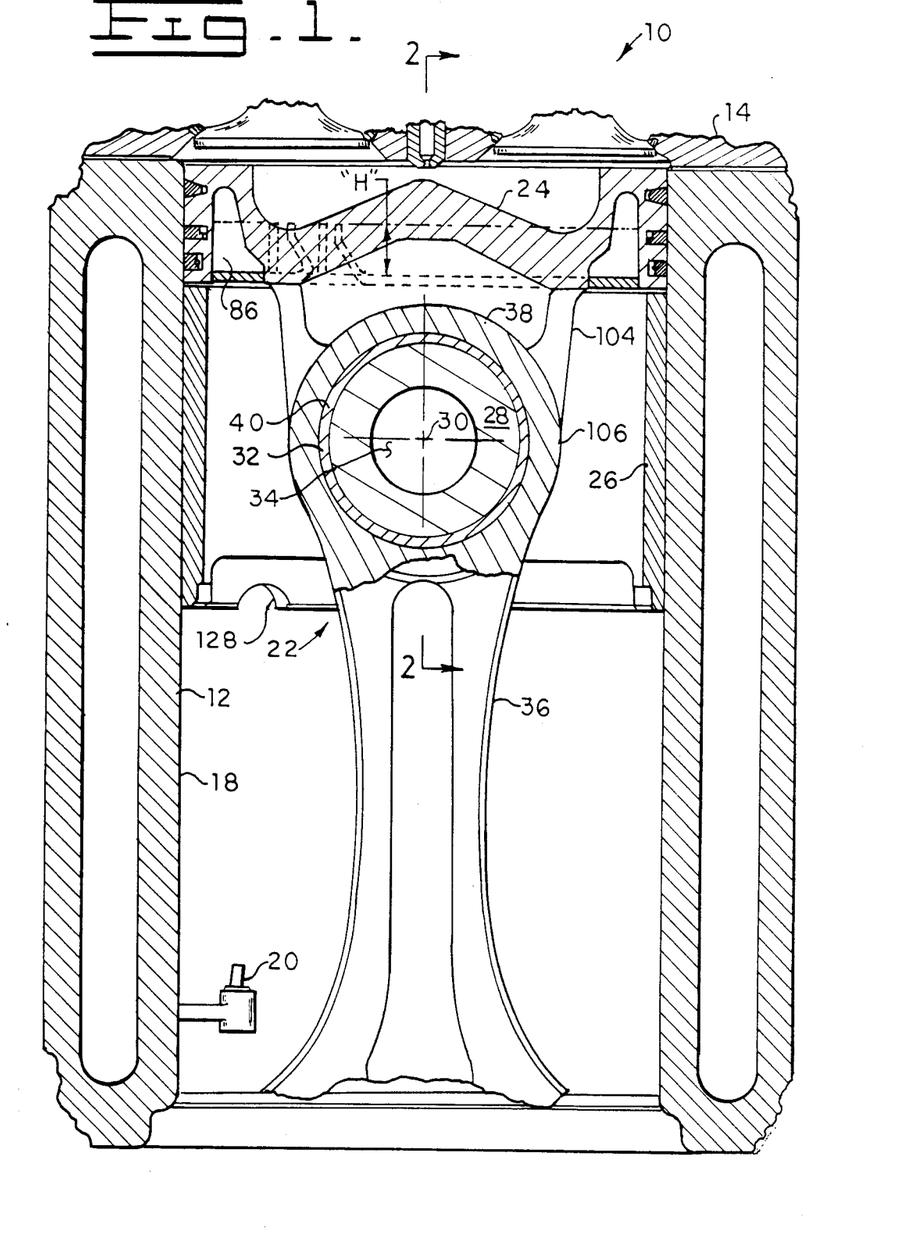
FIG. 1 is a diagrammatic, fragmentary, vertical sectional view of an engine piston assembly constructed in accordance with the present invention.
Figure 2:
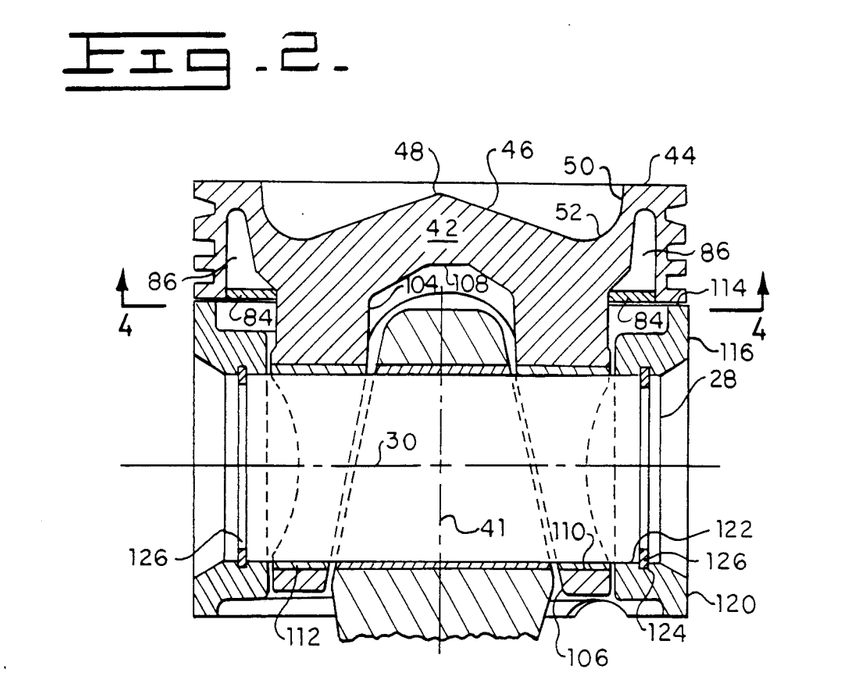
FIG. 2 is a vertical sectional view of a portion of the piston assembly illustrated in FIG. 1 as taken along the line 2—2 thereof.

Referring now to FIGS. 1 and 2, an internal combustion engine 10 includes a one piece block 12 and a cylinder head 14 rigidly secured to the block 12 by a plurality of fasteners or bolts in a conventional manner. The block 12 has a plurality of machined cylinder bores 18 therein, only one of which is shown; each individual bore 18 is provided with coolant flow therearound. The engine 10 could be of any conventional design with or without replaceable cylinder liners.

The engine 10 further includes a plurality of cooling oil directing nozzles 20 one of which is shown in the lower right portion of FIG. 1. Each nozzle is rigidly secured to the block 12 and is operationally associated with a conventional source of pressurized oil, not shown, to supply oil or the like to an articulated piston assembly 22.

The piston assembly 22 of the engine 10 includes an upper steel piston member 24 and a lower aluminum piston skirt 26 which are pivotally mounted on a common wrist pin 28 having a longitudinally orientated central axis 30. The wrist pin is made of a steel material and has an external cylindrical surface 32, and a cylindrical bore 34 therethrough for weight reduction purposes. A conventional connecting rod 36 has a keystone or wedge-like shape or configuration near an upper eye end 38, and a steel-backed bronze sleeve bearing 40 fixedly attached therein and is in either driven by the wrist pin 28 or is driving the wrist pin 28 depending of the engine cycle.

The steel piston member 24 has an upper portion 42 of substantially cylindrical shape and an axis 41 as is illustrated in FIG. 2. The upper portion 42 has a peripheral top surface 44 that is flat, or is located on a plane perpendicular to the axis 41, and a crown surface 46 that in the instant example is a fully machined surface of revolution about the axis 41. The crown surface 46 could be offset from the axis 41 without changing the jist of the invention. In general, the crown surface has a centrally located apex portion 48 elevationally disposed below the top surface, a peripheral or radially outer land portion 50 that is substantially cylindrical and an annular trough 52 that smoothly blends with the apex and outer land portions. The combination of the apex portion 48, the annular trough 52 and the outer land portion 50 greatly improves combustion efficiency.

Figure 3:
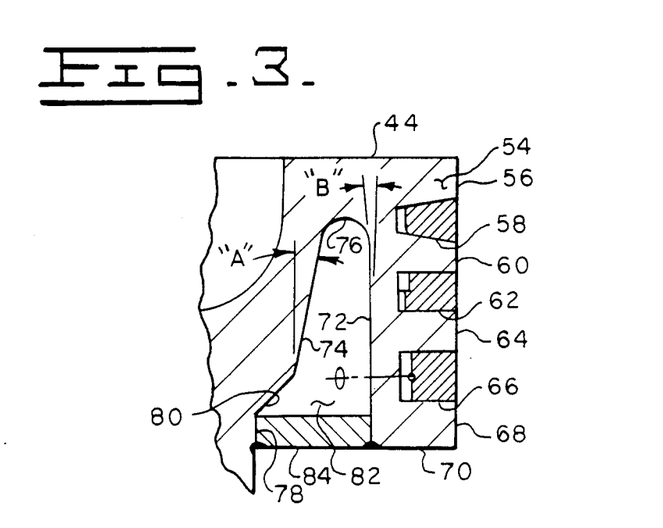
FIG. 3 is an enlarged fragmentary portion of the top peripheral region of the piston member shown in FIG. 1 and 2 showing detailed construction thereof.
Figure 4:
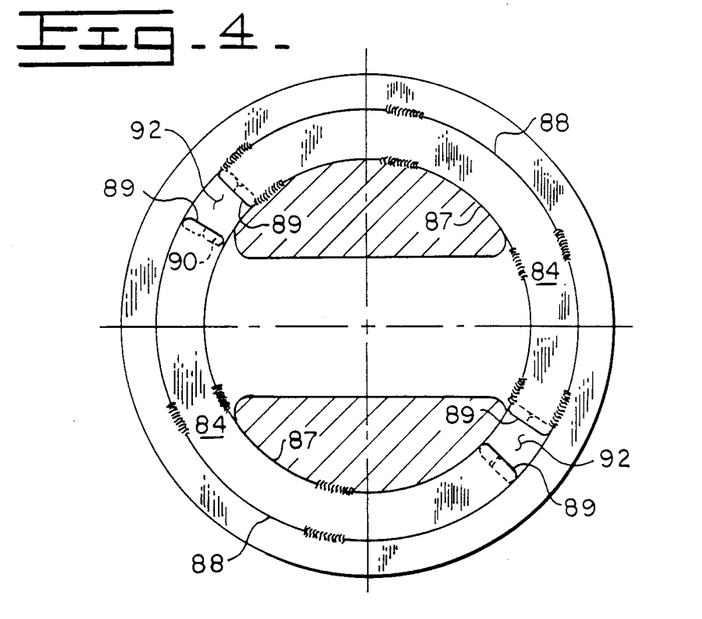
FIG. 4 is a bottom view of the piston member shown in FIG. 2 as taken along line 4—4 thereof with the pin bosses shown in phantom.

As is shown best in FIG. 3, the piston member 24 further includes a tubular wall 54 that depends from the outer edge of the top surface 44 and defines in serially depending order fully around the periphery thereof a top land 56, a top ring groove 58 having a keystone or wedge-like shape in cross section, an upper intermediate land 60, an intermediate ring groove 62 of rectangular cross section, a lower intermediate land 64, a bottom ring groove 66 of rectangular cross section, and a bottom land 68 that is terminated by a lower end surface 70. An annular radially inwardly facing wall surface 72 is also delineated by the wall 54 and extends upwardly from the end surface 70. The upper portion 42 is additionally defined by an annular radially outwardly facing wall surface 74. A downwardly facing cylindrical wall surface 76 is blendingly associated between the wall surfaces 72 and 74. An outwardly facing wall portion 78 is blendingly associated with the wall surface 74 by a transition wall surface 80. The wall surfaces 72, 74, 76 and 80 in their blendingly associated relationships collectively define an annular cooling recess 82 of a precisely defined cross sectional shape and volume. In actuality, the wall surface 74 is conical and has an inclination angle "A"]with respect to the axis 41 of approximately 4 degrees as is shown in FIG. 3. On the other hand, the wall surface 72 is conical and has an inclination angle "B" of approximately 2 ° degrees. As an alternative, the annular cooling recess 82 could be of any configuration to be forged, cast or as an alternative the deep recess as shown in FIG. 3 could be machined.

Figure 5:
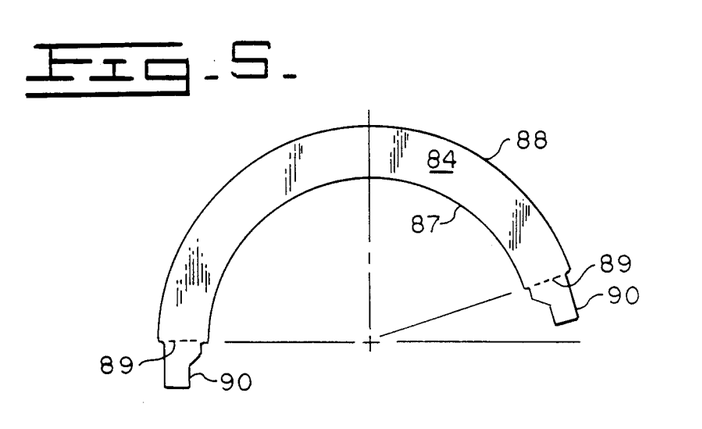
FIG. 5 an enlarged view showing the development of one of the two baffle plates of the piston member shown in FIGS. 1 and 2.
Figure 6:
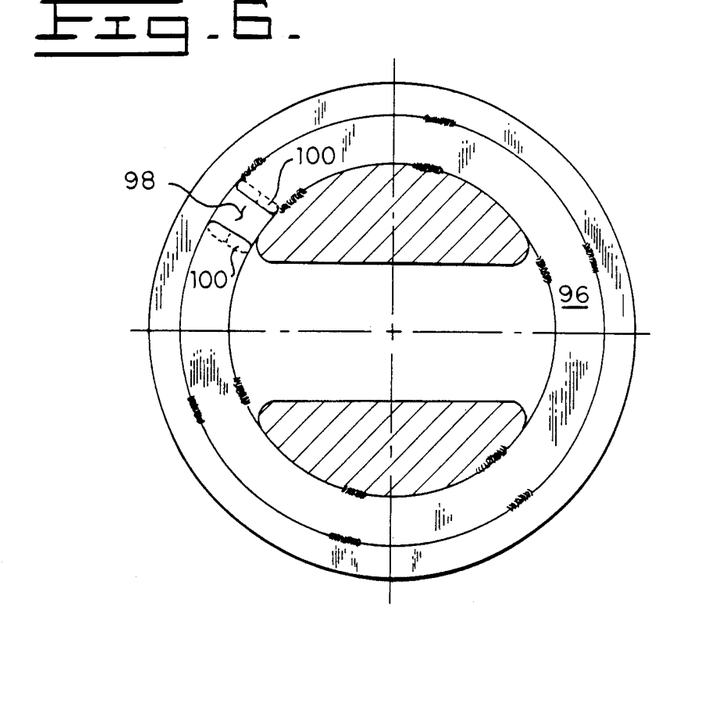
FIG. 6 is a bottom view of the piston member shown with an alternate one piece baffle plate.
Figure 7:
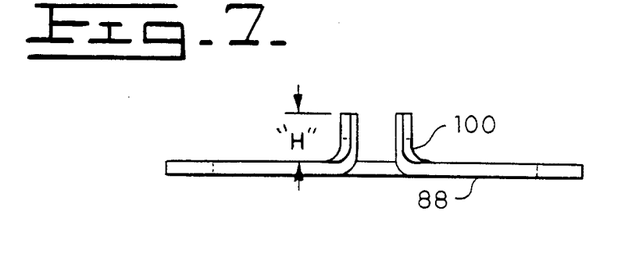
FIG. 7 is a side view of the one piece baffle plate looking directly into the opening and showing the height of the raised portion.

A pair of baffle plates 84 is fixedly attached in sealing relationship to the upper portion 42 of the piston member 24 and forms a pair of cooling galleries or oil troughs 86 therein. The baffle plates 84 in this particular application are attached within the cooling recess 82 between the outwardly facing wall portion 78 and the inwardly facing wall surface 72. As an alternative, not shown, the baffle plates 84 could be attached in any configuration being an heat transferring relationship to the cooling recess 82 such as associated with the outwardly facing wall portion 78 and the end surface 70. The baffle plates in this application are attached by a combination of a welding process and an adhesive process. However, the baffles can be attached to the piston member 24 by various individual welding processes or adhesive bonding processes. As best shown in the remaining FIGS. 4, 5, 6 and 7, each of the baffle plates 84 has an inner radial surface 87, an outer radial surface 88, a pair of ends 89 and a raised portion 90 extending upwardly from each of the pair of ends 89. The raised portion 90 has a height "H" which in this specific application is of approximately 8 mm in length and has a contour to provide a tight fit with the cooling recess 82 thus, insuring that a total preestablished trapped volume in the cooling galleries is set at between 50% and 75% of the total cooling recess volume. The efficiency of the coolant to absorb heat depends primarily on the surface area in contact with the coolant, the quantity of coolant, the coolant temperature, the time the coolant is in contact with the heat and the scrubbing effect of the coolant. A two-thirds percentage or approximately 67% of recess fill has been determined to be the optimum for best heat transfer by a cocktail-shaker and scrubber action within a cavity such as the trapped volume cooling recess 86. A pair of openings 92 is positioned between the pair of baffle plates 84. The openings are positioned diagonally opposite each other so that the piston member 24 can be installed in the engine on the wrist pin 28 in either of two possible positions, and so at least one of the openings will be axially aligned with the oil jet nozzle 20 acting as a fill opening or port and the other opening acting as a spill, exit or overflow opening. A rolled out development of one of the baffle plates 84 is shown in FIG. 5. The raised portions 90 are integrally formed with the plate and will be bent prior to attaching to the piston member 24. As an alternative, as shown in FIG. 6, the pair of cooling galleries 86 could be combined into a single gallery and formed by using a single baffle plate 96 fixedly attached in sealing relationship to the piston member 24. The baffle plate 96 includes a single opening 98 which functions as a fill and spill opening or port, and a pair of upwardly extending portions or dam members 100. The dam members 100, as shown in FIG. 7, have a height "H" which in this specific application is of approximately 8 mm to insure that the trapped volume in the cooling galleries is set at the ideal fill capacity of two-thirds of the total gallery volume.

As a further alternative, although not shown, a pair of openings 98 could be included in the plate 96 and a pair of tubular dam members having a predetermined height could surround the openings 98 and allow the gallery 86 to be a continuous gallery. A single opening 98 could also be constructed with one of the above dam member surrounding the opening and forming a continuous gallery.

The steel piston member 24 further includes a lower portion 104 including a pair of depending pin bosses 106 blendingly associated with the outwardly facing wall portion 78 of the upper portion 42, and blendingly associated also with a downwardly facing concave pocket 108 defined by the upper portion. Each of the pin bosses 106 has a bore 110 therethrough which is adapted to individually receive a steel-backed bronze bearing sleeve 112 therein. These bearing sleeves are axially aligned to receive the wrist pin 28 pivotally therein.

Referring now to the piston skirt 26, it has a top peripheral surface 114 in close non-contacting relationship with the lower end surface 70 of the upper portion 42 of the piston member 24. It further has a slightly elliptical external surface 116 therearound which depends from the top surface. The skirt 26 further has a maximum diameter, not shown, and a minimum diameter 120. A pair of aligned wrist pin receiving bores 122 is formed through the minimum diameter 120 of the piston skirt, and each of the bores 120 has a snap ring receiving groove 124 therein. The piston skirt is thus pivotally mounted on the wrist pin 28 which is slidably positioned in both bores. Excessive movement of the wrist pin along the central axis 30 is prevented by a pair of split retaining rings 126 individually disposed in the grooves 124. The skirt is also provided with a pair of diagonally opposite, recesses 128 which open downwardly at the bottom of the skirt to provide clearance from the nozzle 20 when the skirt is reciprocated to its lowest elevational position.

INDUSTRIAL APPLICABILITY

In operation, the articulated piston assembly 22 reciprocates between top dead center and bottom dead center and a nozzle 20 is continuously directing a stream of coolant, in this application oil, through one of the openings 92. The coolant enters the annular cooling recess 82 scrubbing the wall and absorbing a portion of the heat from the piston assembly 22. The oil which has scrubbed the wall is collected in the pair of cooling galleries 86 with the excess lubricating and cooling oil spilling over the raised portions 90 and exiting through the openings 92. The coolant is collected, cooled and recirculated in a conventional manner. The preestablished trapped volume retained in the cooling galleries 86, which is about two-thirds the total volume of the cooling recess 82, insures that the best possible efficiency for transferring heat into the oil from the piston member 24 with reference to the total volume of the cooling recess 82 is established. Furthermore, the raised portions 90 insure that a trapped volume of coolant is retained in the cooling galleries 86 to be splashed against the surfaces of the annular cooling recess 82. Since during the operation of the engine, reciprocal motion of the articulated piston assembly 22 takes place and coolant is splashed against the surfaces making up the annular cooling recess 82. The splashing takes place especially at the position where the piston assembly acceleration changes direction. The splashed cooling oil scrubs the inwardly facing wall surface 72, the outwardly facing wall surface 74, the downwardly facing cylindrical wall portion 76 and transfers heat from the piston member 24 to the oil.

During the reciprocal motion, upwardly and downwardly the cooling oil retained in the the galleries 86 also absorbs heat from the piston member 24 since the baffle plates 84 are fixedly sealingly attached in relationship to the piston member 24 to form an enhanced thermal conductive path from the heat transferring portion of the piston to the stored coolant in the galleries 86. As the articulated piston assembly 22 reciprocates the continuously spraying nozzle 20 replenishes the supply of coolant in the galleries 86.

From the foregoing, it will be apparent that an articulated piston assembly or a piston member 24 made according to the invention ensures adequate cooling of the piston member 24. It will also be apparent that the baffle plates 84, with their raised portions 90, are fixedly and sealingly attached to the piston member 24 forming closed cooling galleries 86 which have a preestablished trapped volume of about two-thirds the total volume of the cooling recess 82. Thus, the high efficiency of the coolant to absorb heat through the scrubbing action by the coolant and the heat transferred through the plates 84 from the piston member 24 is utilized.

Other aspects, objects and advantages of this invention can be obtained from a study of the drawings, the disclosure and the appended claims.

We claim:

1. An articulated piston assembly including a piston member and a skirt portion adapted for use in an engine comprising:
   the piston member having an upper portion and a lower portion; said upper portion being substantially cylindrical in shape and having a peripheral top surface, a tubular wall depending from the top surface, an outwardly facing wall portion and a downwardly facing annular cooling recess; and said lower portion including a pair of depending pin bosses blendingly associated with the outwardly facing wall portion, said pin bosses individually defining a wrist pin receiving bore aligned on a central axis;

the skirt portion positioned about the lower portion of the piston member and having a pair of wrist pin receiving bores aligned with the central axis;

a wrist pin disposed in the pair of wrist pin receiving bores of the skirt and the wrist pin receiving bores in the lower portion of the piston member attaching the skirt to the piston member; and at least one baffle plate positioned in the annular cooling recess and fixedly sealingly attached to the tubular wall and the outwardly facing wall portion of the upper portion of the piston member in heat conducting relationship forming a cooling gallery having a preestablished trapped volume and at least one opening therein.

2. The articulated piston assembly of claim 1 wherein said preestablished trapped volume has a range of from about 50% to about 75% of the total cooling recess volume.

3. The articulated piston assembly of claim 1 wherein said preestablished trapped volume is about of the total cooling recess volume.

4. The articulated piston assembly of claim 1 wherein said baffle plate includes a pair of plates.

5. The articulated piston assembly of claim 4 wherein each of said pair of plates has an upwardly extending raised portion at each end.

6. The articulated piston assembly of claim 5 wherein said raised portion has a preestablished height to insure that the preestablished trapped volume in the gallery is about 67% of the total cooling recess volume.

7. The articulated piston assembly of claim 5 wherein said ends has a space therebetween forming an inlet and an outlet opening.

8. The articulated piston assembly of claim 1 wherein said baffle plate includes a single plate.

9. The articulated piston assembly of claim 8 wherein said single plate has an opening therein and a pair of upwardly extending raised portions at opposite sides of the opening.

10. The articulated piston assembly of claim 9 wherein said raised portions have a preestablished height to insure that the preestablished trapped volume in the gallery is about 67% of the total cooling recess volume.

11. A steel piston member including an upper portion and a lower portion for reciprocatable movement in a combustion chamber engine comprising:

the upper portion being substantially cylindrical in shape and having a peripheral top surface, a tubular wall depending from the top surface, an outwardly facing wall portion and a downwardly facing annular cooling recess;

the lower portion including a pair of depending pin bosses blendingly associated with the outwardly facing wall portion; and at least one baffle plate positioned in the recess and fixedly sealingly attached to the tubular wall and the outwardly facing wall portion of the upper portion of the piston member in heat conducting relationship forming a cooling gallery having a preestablished trapped volume and at least one opening therein.

12. The steel piston member of claim 11 wherein said preestablished trapped volume has a range of from about 50% to about 75% of the total cooling recess volume.

13. The steel piston member of claim 12 wherein said preestablished volume is about 67% of the total cooling recess volume.

14. The steel piston member of claim 11 wherein said baffle plate includes a pair of plates.

15. The steel piston member of claim 14 wherein each of said pair of plates has an upwardly extending raised portion at each end.

16. The steel piston member of claim 15 wherein said raised portions have a preestablished height to insure that the preestablished trapped volume in the caller is about 67% of the total cooling recess volume.

17. The steel piston member of claim 16 wherein said ends has a space therebetween forming an inlet and a outlet opening.

18. The steel piston member of claim 11 wherein said baffle plate includes a single plate.

19. The steel piston member of claim 18 wherein said single plate has a single opening therein and a pair of upwardly extending raised portions at opposite ends of the opening.

20. The steel piston member of claim 19 wherein said raised portions have a preestablished height to insure that the preestablished trapped volume in the gallery is about 67% of the total cooling recess volume.

21. The steel piston member of claim 16 wherein said ends has a space therebetween forming an inlet and a outlet opening.

22. An articulated piston assembly including a piston member and a skirt portion adapted for use in an engine comprising:

the piston member having an upper portion and a lower portion; said upper portion being substantially cylindrical in shape and having a peripheral top surface, a tubular wall depending from the top surface, an outwardly facing wall portion and a downwardly facing annular cooling recess; and said lower portion including a pair of depending pin bosses blendingly associated with the outwardly facing wall portion, said pin bosses individually defining a wrist pin receiving bore aligned on a central axis;

the skirt portion positioned about the lower portion of the piston member and having a pair of wrist pin receiving bores aligned with the central axis;

a wrist pin disposed in the pair of wrist pin receiving bores of the skirt and the wrist pin receiving bores in the lower portion of the piston member attaching the skirt to the piston member; and at least one baffle plate positioned in the annular cooling recess and fixedly sealingly attached to the upper portion of the piston member in heat conducting relationship forming a cooling gallery having a preestablished trapped volume and at least one opening therein, said preestablished trapped volume has a range of from about 50% to about 75% of the total cooling recess volume.

23. The articulated piston assembly of claim 22 wherein said preestablished trapped volume is about 67% of the total cooling recess volume.

24. The articulated piston assembly of claim 22 wherein said baffle plate includes a pair of plates.

25. The articulated piston assembly of claim 24 wherein each of said pair of plates has an upwardly extending raised portion at each end, said raised portion has a preestablished height to insure that the preestablished trapped volume in the gallery is about 67% of the total cooling recess volume.

26. The articulated piston assembly of claim 25 wherein said ends has a space therebetween forming an inlet and an outlet opening.

27. A steel piston member including an upper portion and a lower portion for reciprocatable movement in a combustion chamber engine comprising:

the upper portion being substantially cylindrical in shape and having a peripheral top surface, a tubular wall depending from the top surface, an outwardly facing wall portion and a downwardly facing annular cooling recess;

the lower portion including a pair of depending pin bosses blendingly associated with the outwardly facing wall portion; and at least one baffle plate positioned in the recess and fixedly sealingly attached to the upper portion of the piston member in heat conducting relationship forming a cooling gallery having a preestablished trapped volume and at least one opening therein, said preestablished trapped volume has a range of from about 50% to about 75% of the total cooling recess volume.

28. The steel piston member of claim 27 wherein said preestablished volume is about 67% of the total cooling recess volume.

29. The steel piston member of claim 27 wherein said baffle plate includes a pair of plates.

30. The steel piston member of claim 29 wherein each of said pair of plates has an upwardly extending raised portion at each end, said raised portions having a preestablished height to insure that the preestablished trapped volume in the caller is about 67% of the total cooling recess volume.

* * * * *

UNITED STATES PATENT AND TRADEMARK OFFICE
CERTIFICATE OF CORRECTION

PATENT NO. : 4,986,167
DATED : January 22, 1991
INVENTOR(S) : Stratton et al.

It is certified that error appears in the above-identified patent and that said Letters Patent is hereby corrected as shown below:

Claim 3. Column 7, line 26, after "about" insert -- 67% --.

Claim 16. Column 8, line 15, remove "caller" and insert -- gallery --.

Signed and Sealed this

Eighteenth Day of August, 1992

Attest:

DOUGLAS B. COMER

Attesting Officer

Acting Commissioner of Patents and Trademarks